No. 847,255. PATENTED MAR. 12, 1907.
F. J. KOBUSCH.
VENTILATOR.
APPLICATION FILED AUG. 27, 1906.
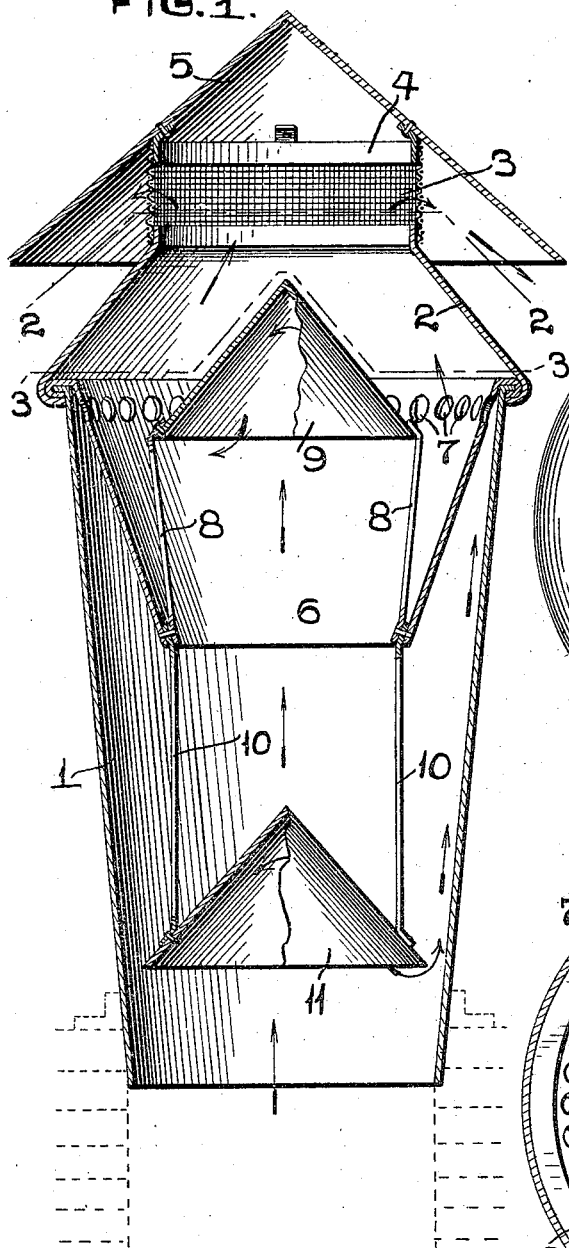
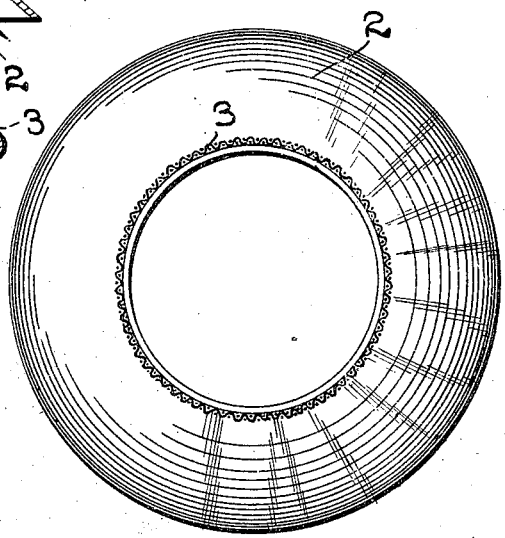
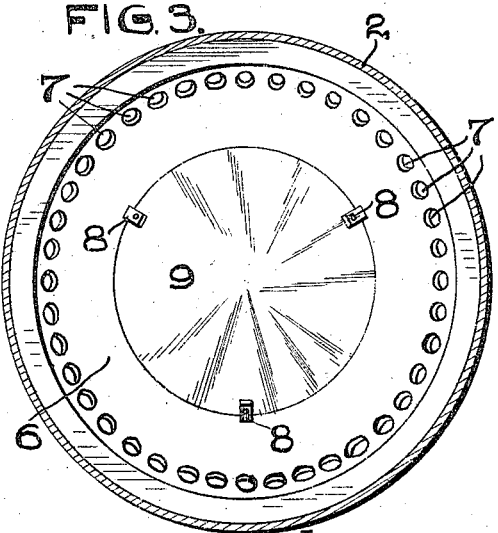
INVENTOR.
FREDRICH J. KOBUSCH.

UNITED STATES PATENT OFFICE.

FREDRICH J. KOBUSCH, OF ST. LOUIS, MISSOURI.

VENTILATOR.

No. 847,255.  Specification of Letters Patent.  Patented March 12, 1907.

Application filed August 27, 1906. Serial No. 332,154.

*To all whom it may concern:*

Be it known that I, FREDRICH J. KOBUSCH, a citizen of the United States, and a resident of St. Louis, Missouri, have invented certain new and useful Improvements in Ventilators, of which the following is a specification containing a full, clear, and exact description, reference being had to the accompanying drawings, forming a part hereof.

My invention relates to a ventilator particularly adapted for the upper ends of flues and ventilator-pipes; and the object of my invention is to construct a simple inexpensive ventilator which combines strength and durability with light weight.

To the above purposes my invention consists in certain novel features of construction and arrangement of parts which will be hereinafter more fully set forth, pointed out in the claims, and illustrated in the accompanying drawings, in which—

Figure 1 is a vertical section taken through the center of a ventilator of my improved construction. Fig. 2 is a horizontal section taken on the line 2 2 of Fig. 1. Fig. 3 is a horizontal section taken on the line 3 3 of Fig. 1.

Referring by numerals to the accompanying drawings, 1 designates the body of my improved ventilator, which is in the form of a vertically-disposed cylinder which tapers slightly toward its lower end and which lower end is tapered to be fitted onto the top of a chimney or on the upper end of a ventilator flue or pipe.

Rigidly fixed to the upper end of the cylindrical body 1 is a sheet-metal member 2 in the form of a truncated cone, and fixed to the upper end of said member 2 is the lower end of a circular wall 3, of reticulated material. Fixed to the upper end of said reticulated wall is a ring 4, and supported thereby is a conical member or cap 5, the diameter of which is somewhat greater than is the upper end of the cylindrical body 1. Rigidly fixed to the upper end of the body 1 is the upper end of a sheet-metal ring 6, the lower end of which is somewhat smaller in diameter than is the upper end, and formed through said ring adjacent its upper end is a row of apertures 7. Fixed to the lower end of the ring 6 and extending upwardly therefrom is a series of standards 8, which support a conical deflector 9, which is concentrically arranged within the body 1 and with its lower end in approximate horizontal alinement with the row of apertures 7. Depending from the lower end of the ring 6 is a series of straps 10, which support a conical deflector 11, similar in size to the conical deflector 9 and concentrically arranged in the lower end of the body 1.

When my improved ventilator is in use, the smoke and gas or foul air rising through the chimney or ventilator-pipe passes into the cylindrical body 1, and, striking against the deflector 11, is thrown thereby outwardly against the wall of the body 1, and from thence the smoke, gas, and air pass upwardly outside the ring 6, through the apertures 7, upwardly through the truncated conical top 2, and finally discharges through the reticulated section 3 to the atmosphere. Any smoke, gas, or air which may pass upwardly through the lower end of the ring 6 strikes against the deflector 9 and is thrown or deflected thereby outwardly and upwardly.

The cap 5 effectually prevents rain and snow from entering the reticulated section 3, and said reticulated section prevents birds from entering and nesting in the ventilator, and where the ventilator is located on the upper end of a ventilator-pipe said reticulated section prevents sparks from adjacent chimneys entering the ventilator and passing downwardly therethrough.

A ventilator of my improved construction is simple, inexpensive, is very strong and durable, can be very cheaply manufactured, and is very efficient in use.

I claim—

1. A ventilator, constructed with a cylindrical body, a perforated ring fixed in the upper end thereof, conical baffle members arranged on the interior of the body, a truncated conical top fixed on the body, a reticulated section arranged at the upper end of said top, and a conical cap supported above the reticulated section; substantially as specified.

2. A ventilator, constructed with a cylindrical body, a ring arranged in the upper end thereof, there being a row of perforations formed in the upper end of said ring, conical baffle members concentrically arranged in the cylindrical body above and below the ring, a top arranged on the cylindrical body, having an open upper end, a reticulated section arranged around the open upper end of the top, and a cap arranged above the reticulated section; substantially as specified.

3. A ventilator, constructed with a cylindrical body, which gradually tapers toward its lower end, a ring fixed in the upper end of said cylindrical body, which ring tapers toward its lower end, there being a row of perforations formed in the upper end of the ring, conical baffle members supported above and below the ring, a truncated conical top for the cylindrical body, a reticulated section fixed to and surrounding the upper end of the truncated conical top, and a conical cap supported by the reticulated section and covering the upper end of the top of the cylindrical body; substantially as specified.

In testimony whereof I have signed my name to this specification in presence of two subscribing witnesses.

FREDRICH J. KOBUSCH.

Witnesses:
M. P. SMITH,
E. L. WALLACE.